Figure 1:
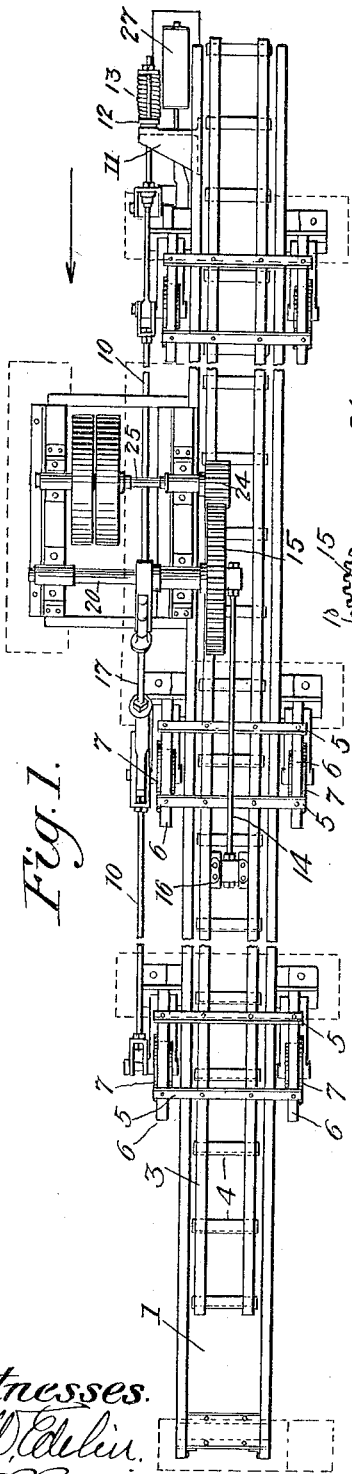

D. J. NEVILL.
STIRRER OR CONVEYER.
APPLICATION FILED MAR. 28, 1912.

1,111,084.

Patented Sept. 22, 1914.
2 SHEETS—SHEET 1.

Witnesses.

Inventor.
David J. Nevill

D. J. NEVILL.
STIRRER OR CONVEYER.
APPLICATION FILED MAR. 28, 1912.
1,111,084.
Patented Sept. 22, 1914.
2 SHEETS—SHEET 2.
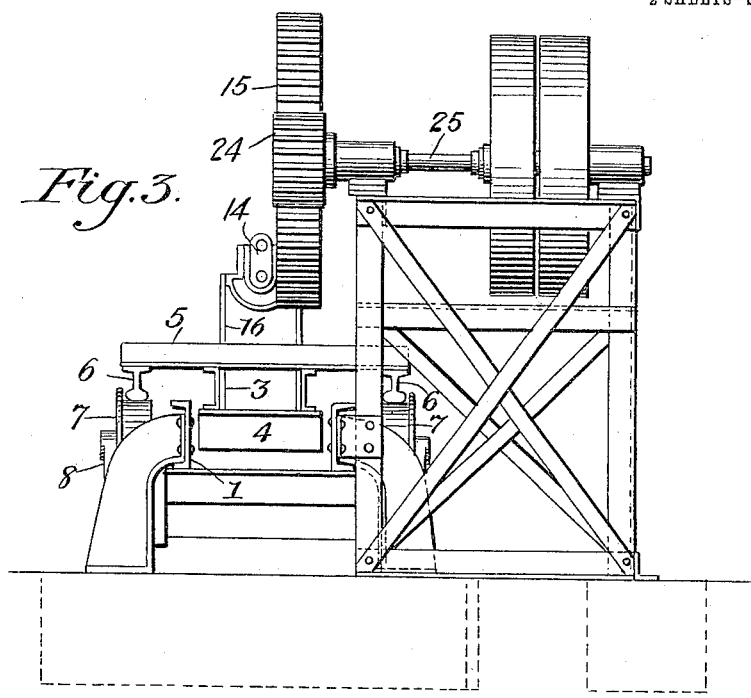
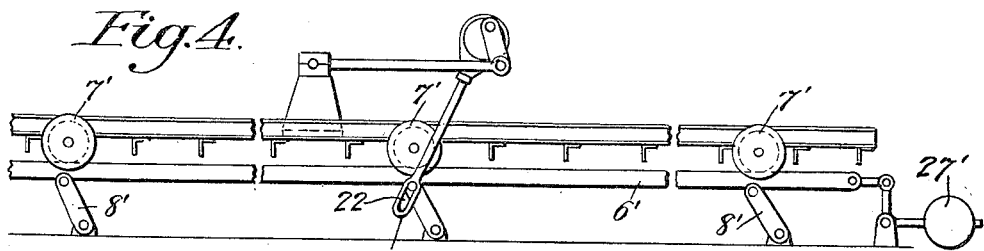
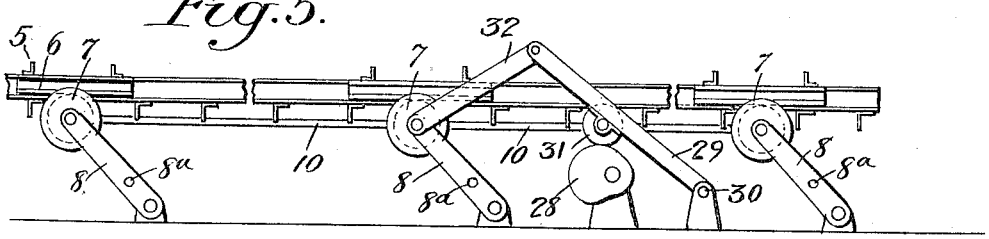
Witnesses.
Inventor.
David J. Nevill.

UNITED STATES PATENT OFFICE.

DAVID J. NEVILL, OF DENVER, COLORADO, ASSIGNOR TO THE STEARNS-ROGER MANUFACTURING CO., OF DENVER, COLORADO, A CORPORATION OF COLORADO.

STIRRER OR CONVEYER.

1,111,084.  Specification of Letters Patent.  Patented Sept. 22, 1914.

Application filed March 28, 1912. Serial No. 686,782.

*To all whom it may concern:*

Be it known that I, DAVID J. NEVILL, a citizen of the United States, residing at Denver, Colorado, have invented certain new and useful Improvements in Stirrers or Conveyers; and I do hereby declare the following to be a full, clear, and exact description of the invention, such as will enable others skilled in the art to which it appertains to make and use the same.

This invention relates to conveyers or stirrers and has particular reference to devices of this kind which embody a rake or similar element for conveying or stirring a body of material placed in a trough or on a hearth or table, which, in the case of drying or roasting furnaces, is heated as the material is stirred or conveyed by the rake.

The object of the invention is to provide new and improved means for imparting to the rake a definite motion which causes it to travel in an orbital path, the lower run of which is parallel to the trough or conveying table.

In the conveyers covered by my previous applications, Serial Numbers 543,130 and 554,278 of February 10, 1910 and April 8, 1910, respectively, a jointed parallelogrammic structure is used, certain members of which are constituted by rakes. This parallelogram is acted upon at any point by suitable operating mechanism to cause the whole structure to have such a movement that the rake travels in an orbital path the lower run of which is parallel to the trough upon which the material is deposited. In the present improved device the parallelogrammic structure is retained but it has been modified so that the entire parallelogram need not be moved.

Broadly it consists of a jointed parallelogrammic structure the lower member of which is constituted by the stationary base portion of the device. The lateral arms of the parallelogram are formed by inclined rocker arms pivoted to the lower base portion. The rake which forms the upper member of the structure is mounted upon these rocker arms and is capable of a reciprocatory motion independent of an oscillatory motion which is imparted to the rocker arms. By combining these two motions the rake can be made to travel in an orbital path. Means is provided for allowing the inclined rocker arms to remain stationary in their lowermost positions during the conveying stroke of the rake, so that during such stroke the rake will travel parallel to the trough and close enough to the same to efficiently convey or stir the material.

The preferred form of the invention is embodied in the accompanying drawings, but as will be seen, various modifications can be made without departing from the spirit or scope of the invention.

Figure 2:
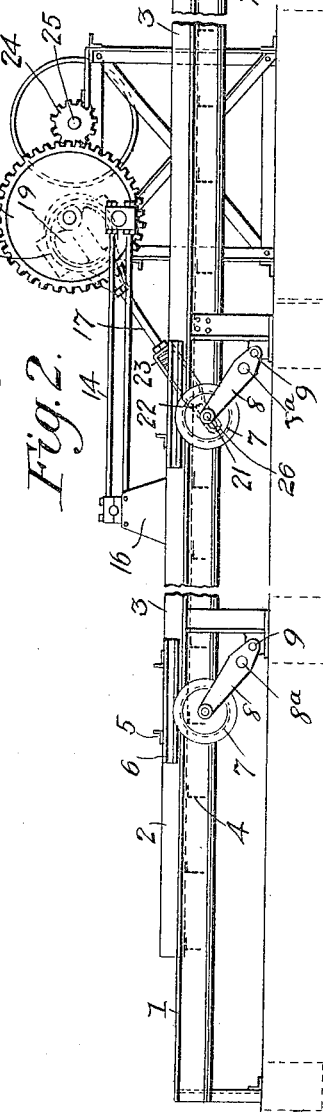

In these drawings: Figure 1 is a plan view of a portion of a conveyer constructed in accordance with the invention, Fig. 2 is a side elevation of the same, Fig. 3 is an end view of the conveyer taken in direction indicated by the arrow in Fig. 1, Fig. 4 is a side elevation of a modified form of the conveyer showing a different style of mounting the rake, and, Fig. 5 is a side elevation of a conveyer provided with a modified form of the raising and lowering means.

Throughout these several views like reference characters designate corresponding parts.

Referring to the first three figures of the drawings 1 indicates a stationary trough, table or hearth adapted to hold the material to be manipulated by a rake 2. The construction of this rake may vary to suit different requirements, but in the present case it consists of a framework 3 provided with transversely depending blades 4. The rake structure is supported by cross pieces 5 carrying rails 6 (Fig. 3), which engage guide wheels 7 preferably of the flanged type. These wheels are rotatably connected to the inclined rocker arms 8 pivoted at points 9 to the base of the structure, the oppositely disposed arms being connected by tie-rods 8ª. In order to limit the downward movement of the arms 8 a link or connecting rod 10 is provided which is pivotally connected to each set of rocker arms to tie them together into a unitary structure. A stop 11 is engaged by a shoulder 12 on the rod to limit its longitudinal movement and hence the downward movement of the rocker arms. A spring 13 is preferably provided on the rod to the rear of the shoulder 12 to absorb the shock when the downward movement of the rocker arms is checked. Any suitable means may be employed to reciprocate the rake, but, preferably, and as illustrated, a crank arm 14 is used, driven by means of gear 15 and pivotally connected at its working end to a bracket 16 applied at any convenient point to the frame 3 of the rake. Means are provided for raising and lowering the rake in timed relation to the reciprocation thereof. This means preferably takes the form of an eccentric rod 17, carrying strap 18 which engages the bushing 19 on the shaft 20 to which the gear 15 is secured. The rod 17 is connected to one of the pivoted rocker arms such as at 21, a slot 22 being provided at the connection for the purpose hereinafter set forth. A shock absorbing spring 23 is preferably provided to furnish the necessary resilience at the connection. Motion is transmitted to the crank arm 14 and the eccentric rod 17 through the gear 15 which is driven by means of pinion 24 on the power driven shaft 25.

It will thus be seen that the operation of the device will be as follows: A reciprocatory motion is transmitted through the gear 15 and crank arm 14 to the rake, which reciprocates freely on the guide wheels 7. The eccentric bushing 18 is so disposed with respect to the joint where the crank arm 14 is connected to the gear 15, that while the crank arm 14 is moving from left to right (Fig. 2) causing the rake to make its conveying stroke, the eccentric rod 16 is moving downwardly. It is desired however that during the entire conveying stroke of the rake the rocker arms will be allowed to remain stationary in their lowest position, thus permitting the rake to travel in close proximity to the trough and parallel thereto throughout such conveying stroke. The slot 22 in the eccentric rod is provided for this purpose. It permits the necessary lost motion so that the downward stroke of the eccentric rod (which takes place during the conveying stroke of the rake) has no effect upon the rocker arms to alter the position of the rake relative to the trough. When the conveying stroke is completed however and the return or nonconveying stroke commences, the eccentric rod 17 has moved upward sufficiently to cause shoulder 26 to engage stud 21. The eccentric rod will then act on the rocker arms to cause them to make one oscillation while the rake is making its return or nonconveying stroke. Such an oscillation of the rocker arms will produce a vertical reciprocation of the rake, and this motion combined with the longitudinal reciprocation will cause the rake to travel back to its starting point in a circumferential or orbital path. It will therefore be lifted over the conveyed material so as not to interfere with the same.

It will be noted that the power needed to oscillate the rocker arms need be applied only at one point as the connecting rods 10 serve to unite the rocker arms into a unitary structure, so that any force applied to one part of the structure will be transmitted equally to the remaining parts. In order to partly counter-balance the moving parts to facilitate the lifting of such parts a weight 27 is provided.

The modification shown in Fig. 4 is operated upon the same principle as the device just described, the difference residing in the fact that the rails and guide wheels are interchanged. In this case the rails are supported by the rocker arms 8' and the guide wheels 7' carried by the rake frame. The rails therefore in this case form a rising and falling track upon which the wheeled rake is mounted. In this modification the counterbalancing weight 27' acts directly upon the track 6'.

Fig. 5 discloses a further modification showing a different method of imparting the oscillatory motion to the rocker arms. In this modification the original construction is used i. e. the wheels are carried by the rocker arms and the rake is mounted on the wheels. Referring to the figure, 28 is a cam driven by any suitable means which are not shown. This cam imparts an oscillatory motion to a rocker arm 29 pivoted at 30 to a stationary part of the structure and carries the cam roller 31 which engages the cam. A link 32 imparts the oscillatory motion from the arm 29 to the rocker arms 8 which support the rake, the several rocker arms 8 being connected by longitudinal links 10, as in Fig. 1.

Thus it is apparent that various means may be used to impart to the various elements of the apparatus the necessary motions to produce the desired orbital motion of the rake, therefore I do not wish to limit myself to the use of any particular means.

What I claim is:

1. In a stirrer or conveyer, a support comprising a plurality of inclined rocker arms, links pivotally connecting said rocker arms to form a parallelogrammic supporting structure, means to oscillate said supporting structure, a rake on said support, a trackway and coöperating wheels serving to mount the rake on the support for reciprocatory movements independent of the support, and means to reciprocate the rake.

2. In a stirrer or conveyer, a support comprising oscillatory rock arms, means connecting said rock arms to cause the same to oscillate in unison, a rake mounted on said support for longitudinal reciprocation independent of the support, means to reciprocate the rake, means to impart a complete oscillation to the rock arms during the non-conveying stroke of the rake, said means adapted to permit said rock arms to remain at rest in their lowermost position during the conveying stroke of the rake, and means to resiliently check the downward movement of the rock arms and to hold said rock arms in their lowermost position during the said conveying stroke of the rake.

3. In a stirrer or conveyer, a support comprising oscillatory rock arms, means connecting said rock arms to cause the same to oscillate in unison, a rake mounted on said support for longitudinal reciprocation independent of the support, a rotary member, a connection between the rake and said rotary member whereby the latter reciprocates the rake, support actuating means connecting said rotary member with said support, a slotted connection between said means and said support whereby the rock arms are raised and lowered during the non-conveying stroke of the rake and are permitted to remain stationary during the conveying stroke of the rake, means to resiliently check the downward movement of the rock arms and to hold the same in their lowermost position during the conveying stroke of the rake, and resilient means associated with said support actuating means.

In testimony whereof I affix my signature in presence of two witnesses.

DAVID J. NEVILL.

Witnesses:
 MARGARET W. HARTISON,
 BURT STEARNS.

Copies of this patent may be obtained for five cents each, by addressing the "Commissioner of Patents, Washington, D. C."